United States Patent [19]
Leavesley et al.

[11] 3,982,418
[45] Sept. 28, 1976

[54] PRESS BRAKE TESTING APPARATUS

[75] Inventors: George W. Leavesley, New Britain; Dever C. Cleavenger, Souderton, both of Pa.

[73] Assignee: The Budd Company, Troy, Mich.

[22] Filed: Dec. 24, 1975

[21] Appl. No.: 644,223

[52] U.S. Cl. .............................. 73/11; 33/125 R; 100/99
[51] Int. Cl.² ........................................ G01P 3/36
[58] Field of Search ................... 73/11, 489, 490; 100/99; 346/20; 33/125 R

[56] References Cited
UNITED STATES PATENTS

| | | | |
|---|---|---|---|
| 1,921,624 | 8/1933 | Lewis | 73/11 |
| 2,340,403 | 2/1944 | Morley et al. | 73/489 X |
| 2,761,307 | 9/1956 | Williams | 73/11 |

*Primary Examiner*—Jerry W. Myracle

[57] ABSTRACT

This application discloses press brake testing apparatus of a self-contained independent form which can be quickly applied to any usual form of press having electrical controls to check the stopping distance or time, or both, after the power has been cut off and the brake simultaneously applied, the testing apparatus comprising a ram-attached flexible indicia strand, automatic take-up means for the flexible strand, means for quickly attaching the end of the flexible strand to a press ram, means for cutting off the power of the press and concurrently applying the brake, means responsive to the movement of the flexible strand for digitally indicating time and distance of stopping, means for initiating the operation of the digital indicating means when the press power is cut off and the brake applied, means for halting the action of the digital indicating means when the ram and strand stop, means to return the press ram to normal stop position after a test, and means for re-setting the digital indicating or read-out means to zero after each test run.

6 Claims, 2 Drawing Figures

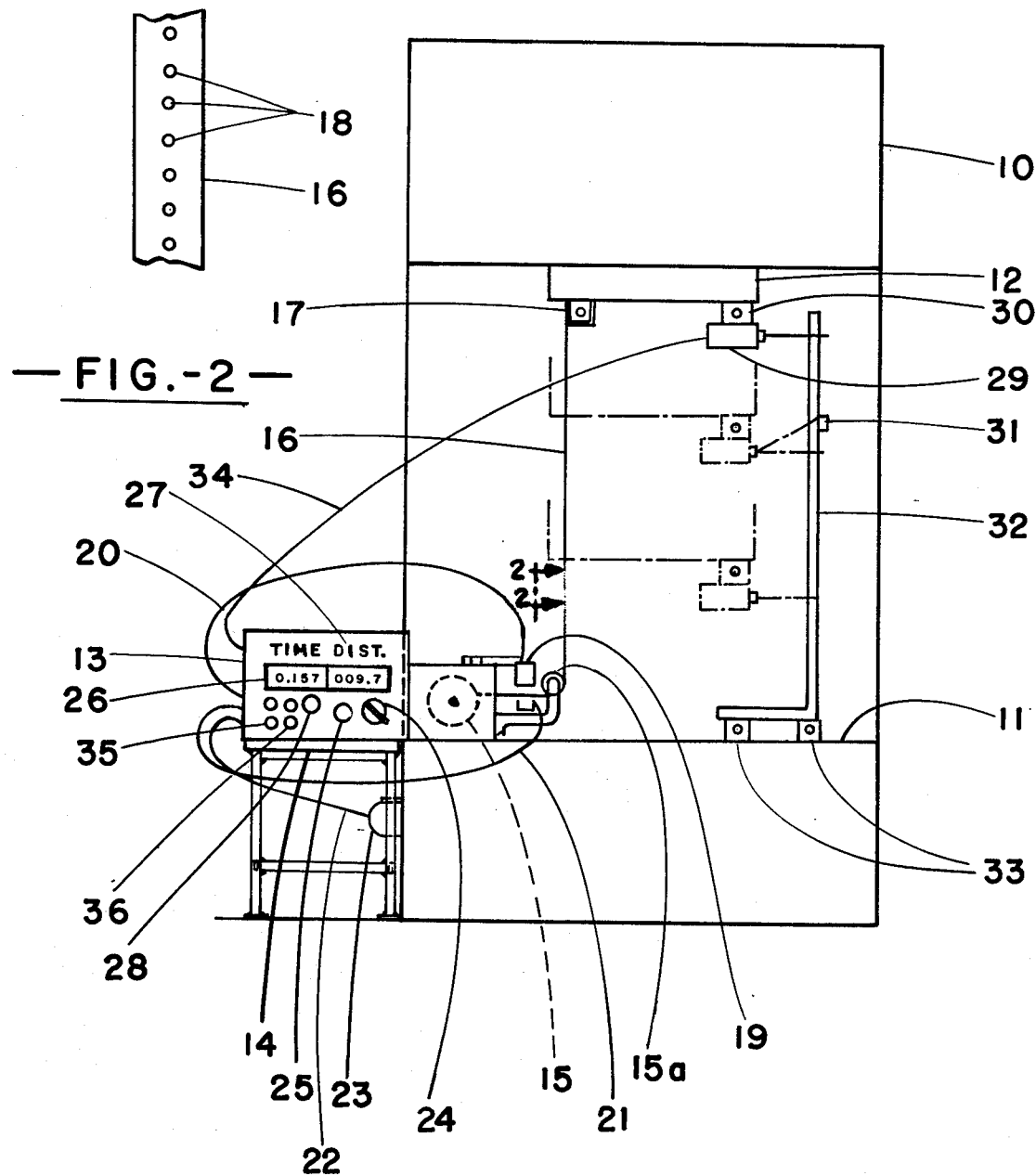

PRESS BRAKE TESTING APPARATUS

BACKGROUND

A safety regulatory agency known as OSHA requires that press brakes be tested, at least periodically, to determine that they are operating satisfactorily. Since sudden unexpected failure cannot easily be predetermined by check, the practical effect of the regulation is to require periodic test checks to determine brake performance and possible deterioration.

There have been some proposals for incorporating the brake test equipment as a permanent part of the press installation, sometimes referred to as on-line equipment to distingush from separate independent test equipment, referred to as off-line test equipment. Permanent built-in test equipment is quite expensive, especially when a considerable number of presses are involved; and since the regulations do not specifically require permanent individual installations, there is a need for separate self-contained test equipment which can be quickly applied and removed to test a number of presses as often as may be needed.

There have been some proposals for independent applied brake testing equipment but, so far as is known, the equipment now available is somewhat complex, not capable of independent press operation and control for tests, difficult to apply, and not free from undesired action of the press while the tests are being conducted.

SYNOPSIS OF INVENTION

The present invention provides press brake testing equipment of a simple form which is separate and independent of the press installation and which can be quickly applied and removed.

For safety reasons, already served by all press installations, presses are provided with plug-in manual controls which are connected to press circuits at what are known as "joy" plugs. When the plugs are pulled and the cables and controls removed the presses cannot be operated inadvertently.

The equipment hereby provided includes self-contained press control means, with cable and joy plug, which can be substituted for the normal manual controls of the press, these being disconnected and put aside while a test is being conducted. The substitute joy plug and connections provide all the power needed for operating and testing the press brake.

The test apparatus includes a test box having a safety key switch which empowers the press operating circuit. With the test box there is provided a flexible ram-attachable indicia control strand, pay-out and take-up reel means for the strand, and attaching means for connecting the end of the strand to the ram of a press, such for example as a magnet on the end of the strand which clings to the metal of the press ram. The end of the strand moves up and down with the press ram and the vertical length or run of the strand passes over a sheave to a horizontal run connected to the take-up reel. The strand is provided with spaced indicia which function with a suitable pick-up device to register the amount of movement of the strand.

Means are provided for initiating the cut-off of power for operating the press ram and therewith the automatic simultaneous application of the brake for stopping the ram movement. This may take the form of a ram-operated limit switch or a device actuated by movement of the ram-actuated strand. For clarity of illustration herein, the ram-actuated limit switch is shown.

The passage of the strand, as registered by the pick-up device, generates pulses which control electronic digital counting means of known form to indicate the stopping time or distance or both, the counting means being started when the press current is cut off and cut off to stop when the ram and strand stop.

For timing, a self-acting device is provided in the box, either mechanical or electrical, which is controlled as to start by press cut-off means and controlled as to stop by strand slow-down. If the strand slow-down is controlled by the spaced indicia of the strand an electrical delay device may be used to keep the digital counter in action until the passage of the indicia slows to a predetermined extent.

The test box also contains controls for re-starting the press to bring the ram to normal stopping position and for re-setting the counters.

DRAWINGS

The objects of the invention, as well as various features of novelty and advantages, will be apparent from the following description of an illustrative embodiment shown in the accompanying drawings, in which:

FIG. 1 is a front elevation of a press with the test apparatus of the invention applied thereto;

FIG. 2 is an enlarged face view of a portion of a flexible indicia strand, taken on the line 2—2 of FIG. 1.

SPECIFIC EMBODIMENT

A press frame 10 with a base 11 is provided with a forming ram 12 which is shown in its top position in full lines and in a plurality of lower positions in broken lines, the lowermost broken lines denoting the lower end position of the ram.

A test box 13 carrying suitable equipment and circuitry is supported on a free open surface of the press base if convenient or partly on the press base and partly on a table 14 standing on the floor.

Carried with the test box 13 there is a take-up reel 15 for a flexible indicia strand 16 which at its free end is attached to the press ram, as by a strong magnet 17. A long spiral spring is found to be satisfactory for operating the reel to keep the strand taut. The strand passes over a sheave 15a carried by the reel box in passing from the generally horizontal run at the reel box to the substantially vertical run connected to the ram. If the magnet is placed against a lower surface of the ram its position is more readily determined.

As herein shown, FIG. 2, the flexible strand is formed as a flat tape with evenly spaced indicia holes 18. The material may be a tough flexible plastic, such as "Mylar", and the hole spacing may conveniently be one-tenth of an inch or correspondingly for the metric system. For such a punched tape the pick-up means may be an electric eye device 19 with an input conductor line 20 and an output conductor line 21.

Other types of strands with other type of indicia may be used instead of a flat punched tape and the pick-up means adapted to suit. Present technology can readily provide magnetic tape and appropriate magnetic pick-up devices. Other systems are available.

The normal hand controls of the press are removed and replaced by a multi-conductor cable 22 having a joy plug 23 connected to the press wiring socket.

Wires and cables herein are shown as having direct paths but it will be understood that the wires and cables provided with the test apparatus will have enough length to adpapt to all expected uses.

The box has a run control device 24, as of a safety type requiring back-turn followed by forward turn and hold, which when operated energizes the circuit to cause the ram to operate. A re-set control device 25 is provided for returning the ram to its normal top stop position after a test.

The test box contains suitable circuitry and devices for controlling operations and for providing read-out of time and distance of travel during stopping. There is a digital time read-out device 26 and a digital distance read-out device 27.

The distance read-out device simply takes an impulse for the passage of each indicia of the strand, a hole here, and delivers the result directly on the read-out device, which may be a known electronic digit indicating device of a re-settable type.

Means are provided for cutting off power to the press ram and this, through circuits already on the press, automatically applies the brake, as is usual on presses. At the same time the counting mechanism for indicating travel distance of the strand, and hence of the ram to which it is connected, is energized.

The time indicating mechanism is energized to start at the same time. The timing means may be a mechanical device, such as an accurate stop-watch with electrical start and stop controls, it may be a synchronous electrical timer, or it may be an electronic oscillator type device with electrical start and stop controls.

The means for cutting off ram power may be controlled by the indicia-bearing strand, as by pre-setting the couter for the passage of a predetermined number of indicia before the current is cut off and the count-down started. Such control is readily effected by the instrumentation of the box or by adding a count-down counter by a pre-settable control 28 on the box.

However, for easier understanding, a companion means is illustrated in the form of a limit switch 29 carried by a magnet 30 attachable to the ram, preferably to its under surface so as to establish ready uniform positioning. A limit switch operator 31 is carried by a pedestal 32 held on the press base, as by magnets 33, the limit switch operator being readily adjustable on the pedestal to any desired position. A conductor cable 34 connects the limit switch with the test box.

Means are also provided for stopping the action of the counters. Since distance is a direct function of strand travel, a simple count of strand indicia will serve to control the distance counter.

However, since the ram and strand will slow down to a stop, the time counter, indicating milliseconds for example, must be kept in operation until the ram comes to a stop. This may readily be accomplished by using a time-lag electronic delay device of known type to keep the circuit of the timer energized while strand indicia are passing the pickup device. When the strand indicia passage is slower than the selected delay time the circuit will be de-energized.

A supervisory control 35 is provided for controlling the main power supply; and a return control 36 is provided for returning the ram to normal stop position after a test. An indicator lamp is shown above each of the controls 35 and 36.

In using the brake test appartus, the normal hand control devices are removed by pulling out the joy plug of the press and inserting the joy plug of the test equipment. With the test box and reel in proper position on the press base, the end of the flexible strand is pulled out and attached to the ram by its end magnet. Care is taken to have the ram-attached run of the strand in a substantially vertical disposition to avoid any error due to angularity.

With the counters at zero, the stop-initiating point is set either at the strand-register device or by the setting of the limit switch and its trip operator.

With the main power switch 35 closed, run control 24 is operated to start the ram into operation. The control 25 is operated to start the ram, put the limit switch in circuit, and condition the counters for operation.

Power is cut off and the brake applied when the trip point is reached, for example at the limit switch 29. When the limit switch is operated the counters begin to register the passage of strand indicia as registered by the electric eye 19.

The pulses produced by the indicia of the strand will register the stopping distance, as in tenths of an inch or such other unit as is chosen.

The timer and its digital counter are started when the ram top signal is given and kept in action while the tape moves sufficiently to keep the electronic delay device energized. When the strand stops the timer and its counter stop to give a visual digital read-out of the stopping time, say to milliseconds.

As representative of stopping time for an effective brake, the figure 0.157 seconds is shown on the time counter; and a representative figure of 009.7 inches is shown on the distance counter. Actually, the counters would have been returned to zero when the return control 36 was actuated to return the ram to its normal top stop position, as shown.

If the counter is used to initiate the ram power cut-off for the next test the counter will be turned back, or a count-down counter set, by the number of units of indicia to be passes from the dead center to the desired cut-off position. Otherwise, the limit switch will be used, as herein described. The limit switch, its trip operator, and the pedestal will not be needed when the counter trip alone is depended upon.

While one embodiment of the invention has been disclosed for purposes of illustration, it is to be understood that there may be other embodiments and modifications within the general scope of the invention.

We claim:

1. Press brake testing apparatus, comprising in combination, a test unit, a connection from the test unit to replace the usual plug-in connection for press hand control, a flexible indicia strand connectible to the press ram, a take-up means for the flexible strand as the connected end follows the movements of the ram, pick-up means providing spaced pulses to the unit in reponse to movement of the ram and the spaced indicia on the flexible strand, means for cutting off the operating power for said ram and applying the ram-stop brake, and electrical digital read-out means responsive to the ram and strand movement and pick-up means for indicating the ram stopping action of the press brake.

2. Press brake testing apparatus as set forth in claim 1, in which the means for indicating the ram stopping action of the press brake includes means for showing the distance travelled by the ram and flexible strand after the brake has been applied and until the ram and strand movement have stopped.

3. Press brake testing apparatus as set forth in claim 1, in which the means for indicating the ram stopping action of the press brake includes means for showing the time of travel of the ram and flexible strand after the brake is applied and until the ram and strand movement have stopped, the timing means acting under power independently of the ram and strand movement but being halted in action in response to halting of the ram and strand movement.

4. Press brake testing apparatus as set forth in claim 1, in which said means for cutting off ram-operating power and applying the brake includes a limit switch unit and an adjustable limit switch trip operator and support, and means for securing the strand end, the limit switch unit, and the operator support on the press.

5. Press brake testing apparatus as set forth in claim 1, in which said test unit includes means for returning the press ram to its normal stop position after a brake stop test has been completed.

6. Press brake testing apparatus as set forth in claim 1, in which a sheave is provided for said flexible strand between a generally horizontal run from the strand take-up means and a generally truly vertical run extending upward to the point of connection to the ram.

* * * * *